(12) United States Patent
Hilber

(10) Patent No.: US 6,513,408 B1
(45) Date of Patent: Feb. 4, 2003

(54) BICYCLE PEDAL

(76) Inventor: Gerhard Hilber, Taxaweg 5, A 6380 St. Johann/Tirol (AT)

( * ) Notice: Subject to any disclaimer, the term of this patent is extended or adjusted under 35 U.S.C. 154(b) by 0 days.

(21) Appl. No.: 09/958,581

(22) PCT Filed: Apr. 11, 2000

(86) PCT No.: PCT/AT00/00087
§ 371 (c)(1),
(2), (4) Date: Oct. 11, 2001

(87) PCT Pub. No.: WO00/61428
PCT Pub. Date: Oct. 19, 2000

(30) Foreign Application Priority Data

Apr. 12, 1999 (AT) .................................................. 637/99

(51) Int. Cl.⁷ .................................................. G05G 1/14
(52) U.S. Cl. ........................ 74/594.4; 74/594.1; 482/57
(58) Field of Search ............................. 74/594.4–594.6, 74/594.1; 482/57, 51, 58–65; D12/125

(56) References Cited

U.S. PATENT DOCUMENTS

| | | | |
|---|---|---|---|
| 3,717,047 A | * 2/1973 | Hill | 74/594.4 |
| 5,449,332 A | 9/1995 | Hervig | |
| 5,628,710 A | 5/1997 | Hervig | |
| 5,992,266 A | * 11/1999 | Heim | 74/594.6 |
| 6,050,154 A | * 4/2000 | Fan | 74/594.4 |
| 6,241,639 B1 | * 6/2001 | Hervig | 482/57 |
| 2002/0100343 A1 | * 8/2002 | Okajima et al. | 74/594.4 |

FOREIGN PATENT DOCUMENTS

| | | | | |
|---|---|---|---|---|
| JP | 1-197193 | * | 8/1989 | 74/594.1 |
| JP | 5-319351 | * | 12/1993 | 74/594.6 |
| JP | 8-239080 | * | 9/1996 | 74/594.4 |

* cited by examiner

*Primary Examiner*—Vinh T. Luong
(74) *Attorney, Agent, or Firm*—Collard & Roe P.C.

(57) ABSTRACT

A pedal for a bicycle is formed by a pedal frame (3) which is rotatably held on a pedal shaft (1) and is swivelable to a limited extent on a support (4) about an axis (5) transversal to the pedal shaft (1), with the support (4) consisting of a sleeve (6) which is rotatably held on the pedal shaft (1) and comprises mutually diametrically opposite radial noses (7) for the transversal axis (5). In order to provide advantageous constructional conditions, the sleeve (6) carries a stop (9) for the pedal frame (3) which projects axially over the pedal shaft (1) and the pedal frame (3) forms a receiving opening (10) for a rubber-elastic ring (11) which can be inserted on the axially projecting stop (9) of the sleeve (6).

1 Claim, 1 Drawing Sheet

BICYCLE PEDAL

CROSS REFERENCE TO RELATED APPLICATIONS

Applicant claims priority under 35 U.S.C. §119 of Austrian Application No. A 637/99 filed Apr. 12, 1999. Applicant also claims priority under 35 U.S.C. §120 of PCT/AT00/00087 filed Apr. 11, 2000. The international application under PCT article 21(2) was not published in English.

BACKGROUND OF THE INVENTION

The invention relates to a pedal for a bicycle with a pedal frame which is rotatably held on a pedal shaft and is swivelable to a limited extent on a support about an axis transversal to the pedal shaft, with the support consisting of a sleeve which is rotatably held on the pedal shaft and comprises mutually diametrically opposite radial noses for the transversal axis.

DESCRIPTION OF THE PRIOR ART

The pedals required for actuating a pedal crank drive of a bicycle are provided with a pedal frame which is rotatable on a pedal shaft and forms either a treading surface for the foot of a cyclist or carries a binding for the detachable coupling with a shoe. Since the pedal shafts which are screwed with a threaded projection into a threaded bore of the pedal cranks need to co-perform the rotations of the pedal crank, the pedal bodies need to be rotatably held on the pedal shaft because the pedal frame needs to adjust to the inclination of the foot or shoe during a revolution of the pedal crank. Despite this free rotational mobility of the pedal frame about the pedal shaft, an ergonomically unfavorable stress occurs on the foot, because on the one hand one cannot expect a leg movement only in a plane perpendicular to the pedal shaft and on the other hand the anatomical conditions of the respective bicycle user require an attack of force on the pedal which departs from the normal line of the treading surface, so that concomitant tilting moments need to be compensated through the foot or leg musculature.

In order to remedy this, it is known (U.S. Pat. No. 5,628,710 A) to hold the pedal frame swivelable to a limited extent about a transversal axis to the pedal shaft on a support. The disadvantage in this known pedal is that the pivot stop of the pedal frame with respect to the support, which consists of a sleeve rotatably held on the pedal shaft, is limited by two transversal bridges of the pedal frame which extend above and below the sleeve and extend in the neutral pivoted position of the pedal frame at a radial distance from the sleeve in order to allow a respective release position for pivoting the pedal frame about the transversal axis to both sides. This means that the pedal frame needs to be designed with a relatively large overall size which in addition entails respective additional weight.

Finally it is known (U.S. Pat. No. 5,449,332 A) to form the pedal frame from a basic body which is held in the usual manner on the pedal shaft and on which a tread is held swivelably about a transversal axis, with two elastic cushion pads being provided on either side of the transversal axis for the resilient support of the tread. Such a pedal construction is provided with an even larger overall size.

SUMMARY OF THE INVENTION

The invention is thus based on the object of providing a pedal for a bicycle of the kind mentioned above in such a way that a low overall size with a comparably low weight is ensured.

This object is achieved by the invention in such a way that the sleeve carries a stop for the pedal frame which projects axially over the pedal shaft and that the pedal frame forms a receiving opening for a rubber-elastic ring which can be inserted on the axially projecting stop of the sleeve.

The limitation to the pivoting of the pedal frame about the transversal axis by a stop of the sleeve-like support which projects axially beyond the pedal shaft offers the advantage that concerning the pivoting limitation of the pedal frame about the transversal axis it is not necessary to consider the rotatability of the support about the pedal shaft. Moreover, said construction can be used in a simple way for a resilient support of the pedal frame with respect to the support, because for this purpose the pedal frame merely needs a receiving opening for a rubber-elastic ring which is inserted on the axially projecting stop of the sleeve. Within the scope of the elastic spring excursion, the limited pivoting movability of the pedal frame about the transversal axis is obtained automatically in this case. As a result of this measure, an adjustment of the pedal frame to the respective spatial position of the sole of the foot or shoe in combination with a small overall size of the pedal is achieved by the force exerted on the pedal frame via the cyclist's foot, which comes with the advantage that tilting moments are substantially compensated.

BRIEF DESCRIPTION OF THE DRAWINGS

The subject matter of the invention is now explained in closer detail by reference to the enclosed drawings, wherein.

Figure 1:
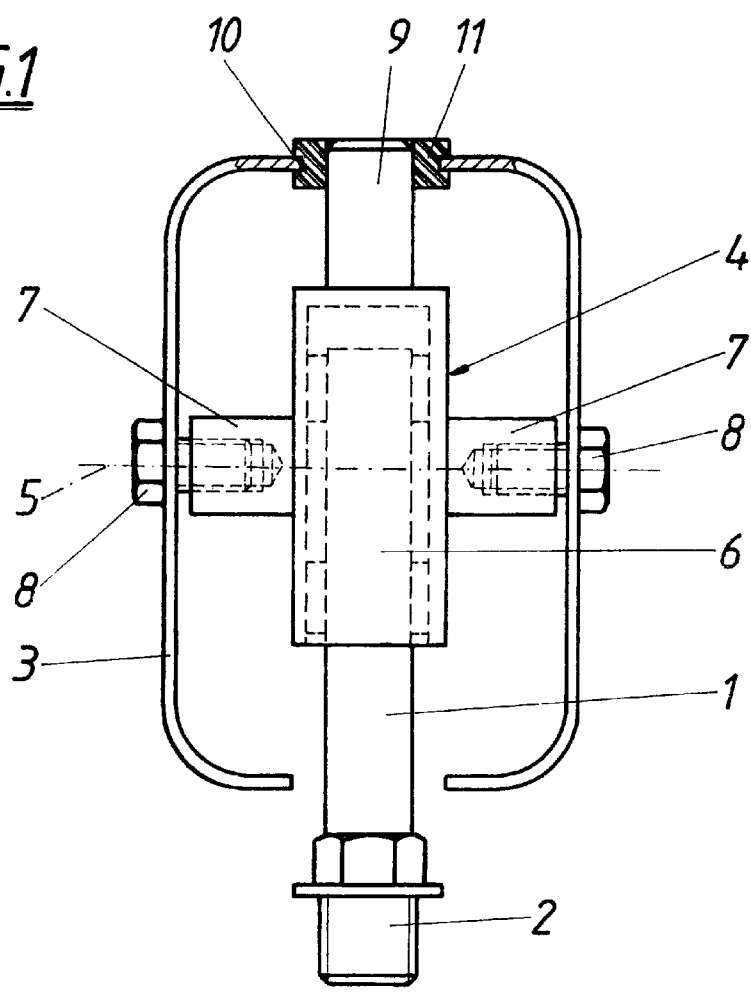
FIG. 1 shows a pedal in accordance with the invention for a bicycle in a simplified top view.
Figure 2:
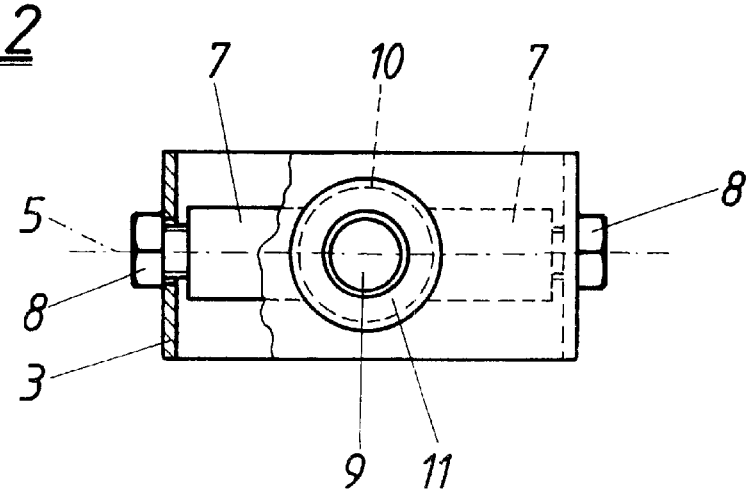
FIG. 2 shows said pedal in a partly elevated front view.

According to the illustrated embodiment, the pedal is provided with a pedal shaft 1 with a threaded nose 2 for fastening to a pedal crank of a bicycle and a pedal frame 3 which is rotatably held on the pedal shaft 1. In contrast to conventional pedals, the pedal shaft 3 is not held directly on the pedal shaft 1, but via a support 4 in order to provide the possibility to pivot the pedal frame 3 additionally about a transversal axis 5. The support 4, which preferably consists of a sleeve 6 which is rotatably held on the pedal shaft 1, is provided for this purpose with diametrically opposed radial noses 7 on which the bracket-like pedal frame 3 is fastened with the help of screws 8 which simultaneously form the transversal shaft 5 about which the pedal frame 3 is held swivelably with respect to support 4. The sleeve 6 is extended beyond the end of the pedal shaft 1 which is opposite of the threaded nose 2 and forms in the region of said extension an axially projecting stop 9 for the pedal frame 3 which receives the stop 9 in a receiving opening 10 with play all around. In order to support the pedal frame 3 with respect to support 4 in a resilient manner, a rubber-elastic ring 11 is inserted into the receiving opening 10 of the pedal frame 3, which ring encloses the stop 9 in such a way that the swivelability of the pedal frame 3 about the transversal axis 5 is limited by the spring deflection of the rubber ring 11.

As a result of these measures, the pedal frame 3, which can form in the conventional manner a treading surface for the foot of a cyclist or a shoe binding, can be rotated in the usual manner about the pedal shaft 1 and can be additionally swiveled about the transversal axis 5 with a limitation by a stop in order to obtain an advantageous ergonomic support which is set automatically depending on the respective foot position of the cyclist when the position of the transversal axis 5 extends at least approximately in the zone of the force's main point of application.

What is claimed is:

1. A pedal for a bicycle with a pedal frame which is rotatably held on a pedal shaft and is swivelable to a limited extent on a support about an axis transversal to the pedal shaft, with the support consisting of a sleeve which is rotatably held on the pedal shaft and comprises mutually diametrically opposite radial noses for the transversal axis, wherein the sleeve (6) carries a stop (9) for the pedal frame (3) which projects axially over the pedal shaft (1) and the pedal frame (3) forms a receiving opening (10) for a rubber-elastic ring (11) which can be inserted on the axially projecting stop (9) of the sleeve (6).

* * * * *